United States Patent
Kang et al.

(10) Patent No.: US 8,812,847 B2
(45) Date of Patent: Aug. 19, 2014

(54) SYSTEM AND METHOD FOR AUTHENTICATING A RESOURCE-CONSTRAINED CLIENT

(71) Applicants: Samsung Electronics Co., Ltd., Gyeonggi-do (KR); Korea University Research and Business Foundation, Seoul (KR)

(72) Inventors: Bo-Gyeong Kang, Gyeonggi-do (KR); Kyu-Young Choi, Seoul (KR); Dong-Hoon Lee, Seoul (KR); Hyo-Seung Kim, Seoul (KR); Ji-Eun Eom, Seoul (KR); Byung-Rae Lee, Seoul (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 79 days.

(21) Appl. No.: 13/683,511

(22) Filed: Nov. 21, 2012

(65) Prior Publication Data
US 2013/0132724 A1    May 23, 2013

(30) Foreign Application Priority Data
Nov. 23, 2011  (KR) .................. 10-2011-0123231

(51) Int. Cl.
*H04L 9/16* (2006.01)

(52) U.S. Cl.
USPC .......................................... 713/171; 713/180

(58) Field of Classification Search
CPC ............ H04L 9/00; H04L 9/32; H04L 9/3284

USPC ................................................... 713/171, 180
See application file for complete search history.

(56) References Cited

U.S. PATENT DOCUMENTS 8,583,915 B1* 11/2013 Huang ........................... 713/155
2011/0075846 A1* 3/2011 Kerschbaum .................. 380/278

FOREIGN PATENT DOCUMENTS

KR    1020090000058    1/2009

OTHER PUBLICATIONS

Ki-Woong Park et al., "pKasso: Towards Seamless Authentication Providing Non-Repudiation on Resource-Constrained Devices", 21st International Conference on Advanced Information Networking and Applications Workshops (AINAW'07), IEEE Computer Society, May 21, 2007.
Eun-Jun Yoon et al., "Robust Matrix-based RFID Mutual Authentication Protocol", Journal of the Korean Institute of Communications and Information Sciences, Nov. 2008.

* cited by examiner

*Primary Examiner* — Matthew Smithers
(74) *Attorney, Agent, or Firm* — The Farrell Law Firm, P.C.

(57) ABSTRACT

A system and method for authenticating a resource-constrained client are provided. The method includes transmitting, by the server, a query message including a first modified secret key to the client, wherein the first modified secret key is generated using a first secret key and a first blinding value; receiving, from the client, a response message including a response value, wherein the response value is generated using the first blinding value, a second secret key, and an error value; calculating the error value from the response value; and determining, based on the error value, whether authentication of the client is successful.

20 Claims, 3 Drawing Sheets

SYSTEM AND METHOD FOR AUTHENTICATING A RESOURCE-CONSTRAINED CLIENT

PRIORITY

This application claims priority under 35 U.S.C. §119(a) to Korean Patent Application Serial No. 10-2011-0123231, which was filed in the Korean Intellectual Property Office on Nov. 23, 2011, the content of which is incorporated herein by reference.

BACKGROUND OF THE INVENTION

1. Field of the Invention

The present invention relates generally to a lightweight authentication method, and more particularly, to an authentication method using minimum resources (circuits, power, etc.) in a resource-constrained device.

2. Description of the Related Art

Authentication is a process of verifying whether an object is genuine, i.e., whether the object is what it declares to be. Often, authentication involves checking whether an entity to be authenticated knows a pre-shared secret key by an authenticating entity. In general, a challenge-response scheme is used in which an authenticating entity transmits a query to an entity to be authenticated and the entity to be authenticated generates and transmits a valid response using a secret key, thus proving that it knows the secret key.

The challenge-response scheme largely uses a public key (or an asymmetric key) encryption system, a secret key (or a symmetric key) encryption system, a Hash function, or a logic operation. However, because a resource-constrained device has a poor computation capability and memory capacity, it cannot use an authentication method requiring complex computations, such as the symmetric/public key encryption system.

Among resource-constrained devices, there is a non-contact identification medium that provides various services including distribution, logistics, stock management, etc., substituting for a conventional barcode system.

In a Radio Frequency IDentification (RFID) system, a reader and an RFID device exchange messages through non-contact RF communication and the reader uses an authentication method to verify whether the RFID is authorized. When needed, the reader and the RFID device use a mutual authentication method.

To avert security problems that the RFID faces and prevent privacy invasion for a user, a number of lightweight authentication methods have been proposed. The security of a mathematical dilemma-based authentication method using logic operations can be proved theoretically because it is based on the Learning Parity with Noise (LPN) problem known to be Nondeterministic Polynomial (NP)-hard.

However, the conventional mathematical dilemma-based authentication method using logic operations is vulnerable to a man-in-the-middle type attack.

SUMMARY OF THE INVENTION

Accordingly, the present invention is designed to address at least the problems and/or disadvantages described above, and to provide at least the advantages described below.

An aspect the present invention is to provide an authentication method that ensures security against a man-in-the-middle type attack.

Another aspect the present invention is to provide an authentication method that provides resource efficiency by minimizing a memory capacity requirement, a computation volume, and a transmission overhead.

Another aspect the present invention is to provide an authentication method that enables mathematical dilemma-based security.

In accordance with an aspect of the present invention, a method is provided for authenticating a resource-constrained client at a server. The method includes transmitting, by the server, a query message including a first modified secret key to the client, wherein the first modified secret key is generated using a first secret key and a first blinding value; receiving, from the client, a response message including a response value, wherein the response value is generated using the first blinding value, a second secret key, and an error value; calculating the error value from the response value; and determining, based on the error value, whether authentication of the client is successful.

In accordance with another aspect of the present invention, an authentication method of a resource-constrained client is provided. The method includes transmitting, to a server, a blinding message including a first modified secret key, wherein the first modified secret key is generated using a first secret key and a first blinding value; receiving, from the server, a query message including a second modified secret key, wherein the second modified secret key is generated using a second secret key and a second blinding value; and transmitting, to the server, a response message for authenticating the client including a response value, wherein the response value is generated using the first and second blinding values, third and fourth secret keys, and an error value.

In accordance with another aspect of the present invention, a server is proved for authenticating a client. The server includes a communication module that transmits and receives messages to and from the client; and a controller that transmits via the communication module a query message including a first modified secret key to the client, wherein the first modified secret key is generated using a first secret key and a first blinding value, receives, via the communication module, a response message including a response value, wherein the response value is generated using the first blinding value, a second secret key, and an error value, calculates the error value from the response value, and determines, based on the error value, whether authentication of the client is successful.

In accordance with another aspect of the present invention, a client is provided that performs an authentication procedure with a server. The client includes a communication module that transmits and receives messages to and from the server; and a controller that transmits, via the communication module, a blinding message including a first modified secret key to the server, wherein the first modified secret key is generated using a first secret key and a first blinding value, receives, via the communication module, a query message including a second modified secret key from the server, wherein the second modified secret key is generated using a second secret key and a second blinding value, and transmits, via the communication module, a response message for authenticating the client including a response value to the server, wherein the response value is generated using the first and second blinding values, third and fourth secret keys, and an error value.

BRIEF DESCRIPTION OF THE DRAWINGS

The above and other aspects, features, and advantages of certain embodiments of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
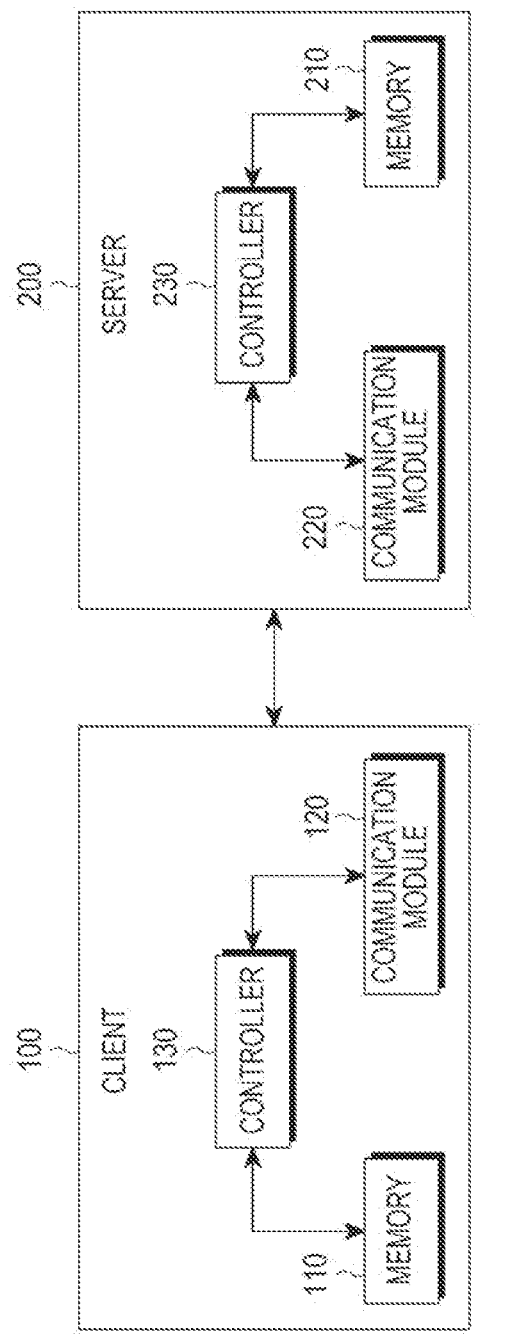
FIG. 1 is a block diagram illustrating an authentication system according to an embodiment of the present invention.

FIG. 1 is a block diagram illustrating an authentication system according to an embodiment of the present invention.

Referring to FIG. 1, the authentication system includes a client 100, which is a device to be authenticated, and a server 200, which is a device that authenticates.

The client 100 includes a memory 110 for storing information for an authentication process, such as secret keys, a communication module 120 for wirelessly communicating with the server 200, and a controller 130 for performing a predetermined authentication process on the server 200 using the memory 110 and the communication module 120. Herein, the term "module" refers to hardware or a combination of hardware and software.

The server 200 includes a memory 210 for storing information for an authentication process, such as secret keys, a communication module 220 for wirelessly communicating with the client 100, and a controller 230 for performing a predetermined authentication process on the client 100 using the memory 210 and the communication module 220.

More specifically, the server 200 shares information for an authentication process, such as secret keys, with the client 100. The shared information includes a k-bit binary vector x, which is a first secret key, a k-bit binary vector y, which is a second secret key, an m×k binary matrix A, which is a third secret key, an m×k binary matrix B, which a fourth secret key, and an error generation parameter η, which is a probability satisfying 0<η<1/2. Herein, each of the vectors and the matrices may be expressed as a bit stream.

Figure 2:
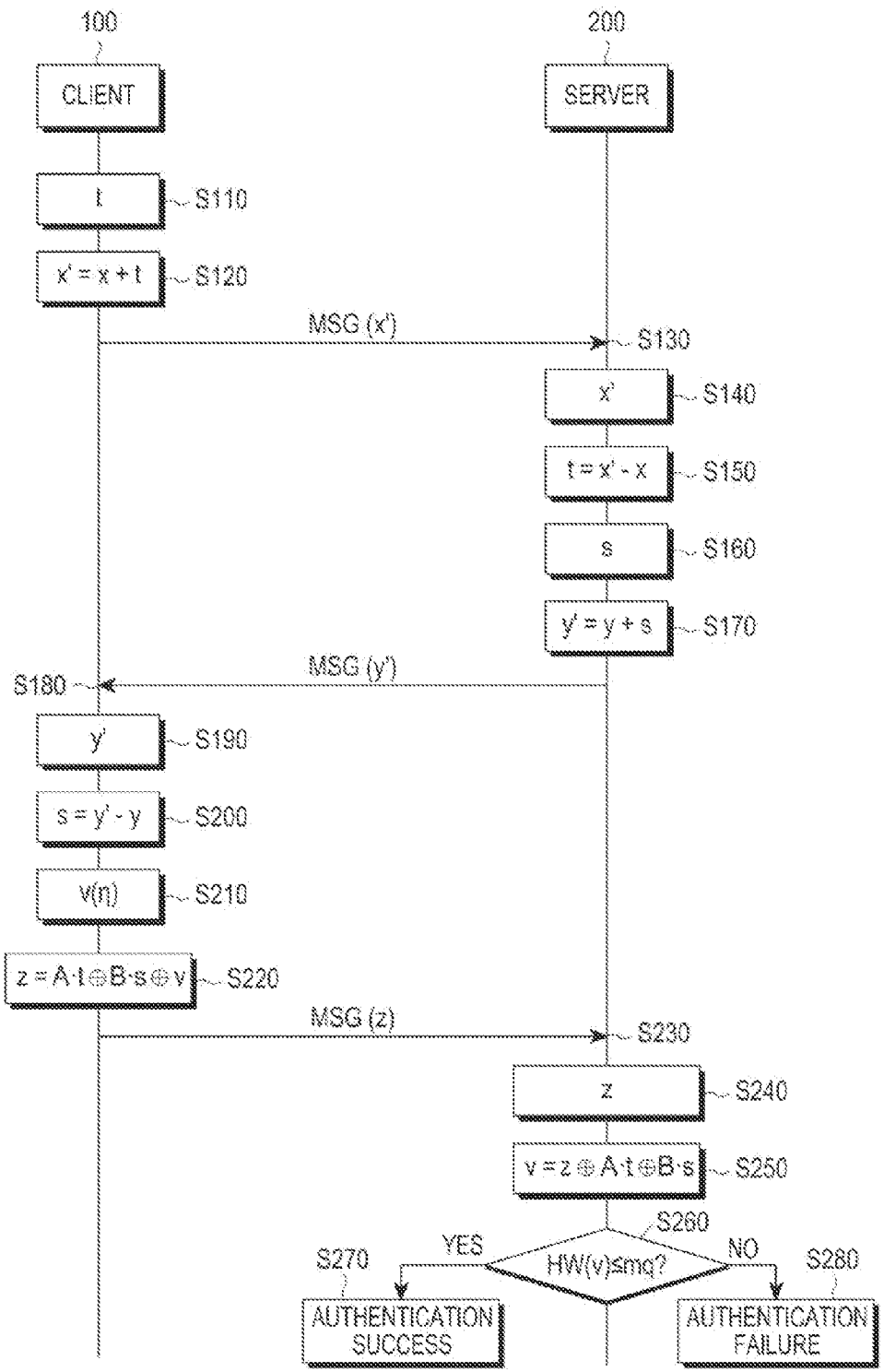
FIG. 2 is a flowchart illustrating a method for authenticating a resource-constrained client according to an embodiment of the present invention.

FIG. 2 is a flowchart illustrating a method for authenticating a resource-constrained client according to an embodiment of the present invention.

Referring to FIG. 2, the client 100 generates a k-bit binary vector t ($\in\{0,1\}$k), which is a first blinding vector, in step S110. A binary vector (or matrix) is a vector (or matrix) having 0s or 1s as its elements. The first blinding vector t is not known to the server 200 and each bit of the first blinding vector t may be randomly selected between bit values 0 and 1. For example, for k=10, the first blinding vector t may be t=(0101100011).

In step S120, the client 100 generates a first modified k-bit secret key x' using a first secret key x and the first blinding vector t by a predetermined first function.

In accordance with an embodiment of the present invention, for the input of the first secret key x, which is known to the server 200, and the first blinding vector t, which is unknown to the server 200, the first function outputs the first modified secret key x' by adding the first secret key x to the first blinding vector t, as shown in Equation (1).

$$x'=x+t \qquad (1)$$

Because the client 100 and the server 200 share the first function, the server 200 knows the first function. The server 200 stores an inverse function of the first function, i.e., a first inverse function, in the memory 210. While the first function in Equation (1) is an addition function herein, this is purely exemplary. Thus, a subtraction function or various logic operation functions like an exclusive OR (XOR) is available as the first function. The same thing applies to other functions. Herein, the term "secret key" is interchangeably used with "original secret key" to be distinguished from the term "modified secret key". For example, the first secret key x and the first modified secret key x' may be x=(1101000101) and x' as calculated in Equation (2).

$$\begin{array}{r}1101000101\\+0101100011\\\hline x'=0010101000\end{array} \qquad (2)$$

The client 100 generates a blinding message MSG(x') including the first modified secret key x' and transmits the blinding message MSG(x') to the server 200 in step S130.

Upon receipt of the blinding message MSG(x'), the server 200 extracts the first modified secret key x' from the blinding message MSG(x') in step S140.

In step S150, the server 200 calculates the first blinding vector t using the first modified secret key x' and the first secret key x by the first inverse function of the first function.

In accordance with an embodiment of the present invention, for the input of the first secret key x and the first modified secret key x', the first inverse function outputs the first blinding vector t by subtracting the first secret key x from the first modified secret key x' as shown in Equation (3).

$$t=x'-x \qquad (3)$$

Thus, the first inverse function is a subtraction function. Alternatively, steps S110 to S150 may be performed after step S180, or the first modified secret key x' may be transmitted in a response message in step S230.

Derivation of the first blinding vector t using the first inverse function may be expressed as shown in Equation (4).

$$\begin{array}{r}0010101000\\-1101000101\\\hline t=0101100011\end{array} \qquad (4)$$

The server 200 generates a k-bit binary vector s, which is a second blinding vector, in step S160. The second blinding vector s is not known to the client 100 and each bit of the second blinding vector s may be randomly selected between bit values 0 and 1. For example, the second blinding vector s may be s=(0110101010).

In step S170, the server 200 generates a second modified k-bit secret key y' using a second secret key y and the second blinding vector s by a predetermined second function.

In accordance with an embodiment of the present invention, for the input of the second secret key y, which is known to the client 100, and the second blinding vector s, which is unknown to the client 100, the second function outputs the second modified secret key y' by adding the second secret key x to the second blinding vector s, as shown in Equation (5).

$$y'=y+s \quad (5)$$

Thus, the second function is an addition function. The client 100 and the server 200 share the second function. That is, the client 100 stores the inverse function of the second function, i.e., a second inverse function, in the memory 110. For example, the second modified secret key y' may be calculated using Equation (6).

$$\begin{aligned} & 0110010010 \\ +& 0110101010 \\ \hline y' =& 1100111100 \end{aligned} \quad (6)$$

The server 200 generates a query message MSG(y') including the second modified secret key y' and transmits the query message MSG(y') to the client 100 in step S180.

Upon receipt of the query message MSG(y'), the client 100 extracts the second modified secret key y' from the query message MSG(y') in step S190.

In step S200, the client 100 calculates the second blinding vector s using the second modified secret key y' and the second secret key y by the second inverse function of the second function.

In accordance with an embodiment of the present invention, for the input of the second secret key y and the second modified secret key y', the second inverse function outputs the second blinding vector s by subtracting the second secret key y from the second modified secret key y' as shown in Equation (7).

$$s=y'-y \quad (7)$$

Derivation of the second blinding vector s using the second inverse function may be expressed as shown in Equation (8).

$$\begin{aligned} & 1100111100 \\ -& 0110010010 \\ \hline s =& 0110101010 \end{aligned} \quad (8)$$

In step S210, the client 100 generates an m-bit binary vector v, which is an error vector. If $v=\{v_1, v_2, \ldots, v_m\}$, the error vector v is a binary vector with a probability of η that $v_i=1$. The bits of the error vector v are determined according to the error generation parameter η being a probability value that satisfies $0<\eta<1/2$. The bit number of the error vector v, i.e., m, and the bit number of the blinding vector s, i.e., k, are natural numbers. The binary vector v may be an output of a random function that receives the error generation parameter η as an input, expressed as v(η). For example, m=5, d η=1/5, and the binary vector v may be v=(00010).

In step S220, the client 100 generates an m-bit binary vector, i.e., a response vector z using third and fourth secret keys A and B, the first and second blinding vectors t and s, and the error vector v by a predetermined third function.

In accordance with an embodiment of the present invention, for the inputs of the third and fourth secret keys A and B, the first and second blinding vectors t and s, and the error vector v, the third function outputs the response vector z by sequentially XOR-operating the inner product of the third secret key A and the first blinding vector t, the inner product of the fourth secret key B and the second blinding vector s, and the error vector v, as shown in Equation (9).

$$z=((A \cdot t) \oplus (B \cdot s) \oplus v) \quad (9)$$

For example, the response vector z may be given in Equation (10).

$$z = At \oplus Bs \oplus v \quad (10)$$

$$= \begin{pmatrix} 1 & 0 & 1 & 1 & 0 & 1 & 1 & 1 & 0 & 1 \\ 0 & 1 & 0 & 1 & 1 & 0 & 1 & 1 & 1 & 0 \\ 0 & 0 & 1 & 0 & 1 & 1 & 0 & 1 & 1 & 1 \\ 1 & 0 & 0 & 1 & 0 & 1 & 1 & 0 & 1 & 1 \\ 0 & 1 & 0 & 0 & 1 & 0 & 1 & 1 & 0 & 1 \end{pmatrix} \begin{pmatrix} 0 \\ 1 \\ 0 \\ 1 \\ 1 \\ 0 \\ 0 \\ 0 \\ 1 \\ 1 \end{pmatrix} \oplus$$

$$\begin{pmatrix} 0 & 1 & 1 & 0 & 1 & 1 & 0 & 1 & 0 & 0 \\ 1 & 0 & 1 & 1 & 0 & 1 & 1 & 0 & 1 & 0 \\ 1 & 1 & 0 & 1 & 1 & 0 & 1 & 1 & 0 & 1 \\ 1 & 1 & 1 & 0 & 1 & 1 & 0 & 1 & 1 & 0 \\ 1 & 1 & 1 & 1 & 0 & 1 & 1 & 0 & 1 & 1 \end{pmatrix} \begin{pmatrix} 0 \\ 1 \\ 1 \\ 0 \\ 1 \\ 0 \\ 1 \\ 0 \\ 1 \\ 0 \end{pmatrix} \oplus \begin{pmatrix} 0 \\ 0 \\ 0 \\ 1 \\ 0 \end{pmatrix}$$

$$= \begin{pmatrix} 0 \\ 0 \\ 1 \\ 1 \\ 1 \end{pmatrix} \oplus \begin{pmatrix} 1 \\ 1 \\ 1 \\ 0 \\ 0 \end{pmatrix} \oplus \begin{pmatrix} 0 \\ 0 \\ 0 \\ 1 \\ 0 \end{pmatrix}$$

$$= \begin{pmatrix} 1 \\ 1 \\ 0 \\ 0 \\ 1 \end{pmatrix}$$

To enhance security, the first secret key x, the third secret key A, and the first blinding vector t are used together with the second secret key y, the fourth secret key B, and the second blinding vector s. Alternatively, the first secret key x, the third secret key A, and the first blinding vector t may not be used. In this case, steps S110 to S150 may be omitted.

Alternatively, the fourth secret key B may be set to be equal to the third secret key A. That is, the third secret key A may be used instead of the fourth secret key B.

In step S230, the client 100 generates a response message MSG(z) including the response vector z and transmits the response message MSG(z) to the server 200.

Upon receipt of the response message MSG(z), the server 200 extracts the response vector z from the response message MSG(z) in step S240.

The server 200 calculates the error vector v using the third and fourth secret keys A and B, the first and second blinding vectors t and s, and the response vector z by a third inverse function being the inverse function of the third function in step S250.

In accordance with an embodiment of the present invention, for the input of the third and fourth secret keys A and B, the first and second blinding vectors t and s, and the error vector v, the third inverse function outputs the error vector v by sequentially XOR-operating the response vector z, the inner product of the third secret key A and the first blinding vector t, and the inner product of the fourth secret key B and the second blinding vector s, i.e., v=(z⊕(A·t)⊕(B·s)), Deriving the error vector v using the third inverse function may be given as shown in Equation (11).

$$v = z \oplus At \oplus Bs \quad (11)$$

$$= \begin{pmatrix} 1 \\ 1 \\ 0 \\ 0 \\ 1 \end{pmatrix} \oplus \begin{pmatrix} 0 \\ 0 \\ 1 \\ 1 \\ 1 \end{pmatrix} \oplus \begin{pmatrix} 1 \\ 1 \\ 1 \\ 0 \\ 0 \end{pmatrix}$$

$$= \begin{pmatrix} 0 \\ 0 \\ 0 \\ 1 \\ 0 \end{pmatrix}$$

In step S260, the server 200 calculates a Hamming weight of the error vector v and compares the Hamming weight with a threshold mq (=m·q). Here, q may be less than 1, for example, q=1/4. If the Hamming weight is less than or equal to the threshold mq in step S260, the server 200 determines that the authentication of the client 100 is successful in step S270. If the Hamming weight exceeds the threshold mq in step S206, the server 200 determines that the authentication of the client 100 has failed in step S280. The Hamming weight is the number of bits having 1s in the bits of the error vector v.

Alternatively, the number of bits having 0s in the bits of the error vector v may be compared with a threshold (the total bit number of the error vector v−mq). For example, the Hamming weight of the error vector v, i.e., HW(v), may be calculated using Equation (12).

$$HW(v) = HW(00010) = 1 \leq 5 \cdot \frac{1}{4} \quad (12)$$

Subsequently, the server 200 may transmit the authentication result to the client 100. Alternatively, the server 200 may include a display, such as a monitor, and an output unit, such as a speaker, a printer, etc., and may output the authentication result through the display or the output unit. Alternatively, the server 200 may transmit the authentication result to a communication terminal like another server, a portable terminal, etc., through the communication module 220.

To share secret keys and parameters between the client 100 and the server 200, a step of receiving and storing the secret keys and parameters from a third device at each of the client and the server may be added before step S110. Alternatively, the client 100 may receive the secret keys and parameters from the server 200, or vice versa.

Figure 3:
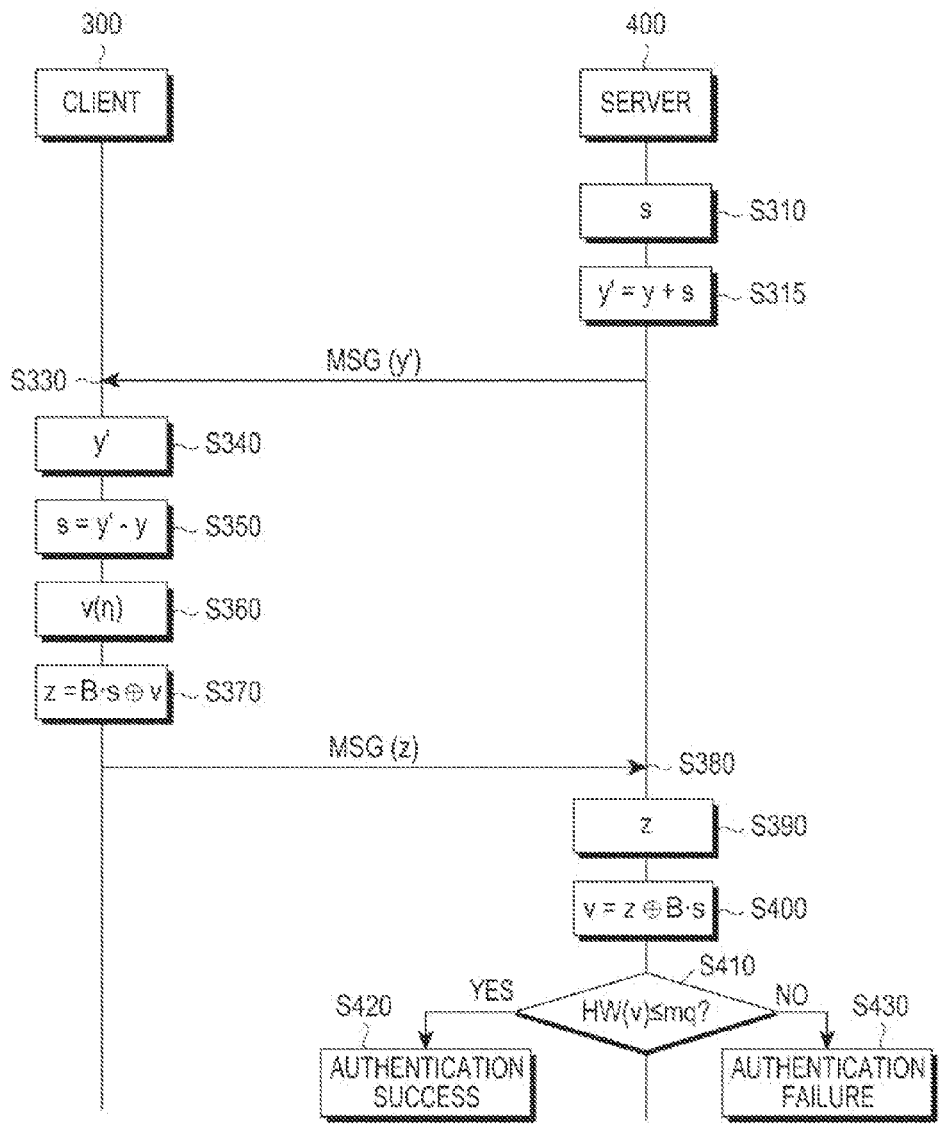
FIG. 3 is a flowchart illustrating a method for authenticating a resource-constrained client according to another embodiment of the present invention.

FIG. 3 is a flowchart illustrating a method for authenticating a resource-constrained client according to another embodiment of the present invention. Specifically, FIG. 3 illustrates an authentication method using two secret keys y and B and a single blinding vector s. The following description of FIG. 3 will focus mainly on the difference from that illustrated in FIG. 2.

Referring to FIG. 3, a client 300 and a server 400 have the same configurations as illustrated in FIG. 1. The client 300 and the server 400 share information used for an authentication process, such as secret keys. The shared information includes a k-bit binary vector y, which is a first secret key, an m×k binary matrix B, which is a second secret key, and an error generation parameter 11, which is a probability satisfying $0 < \eta < 1/2$. The vector and matrix may be expressed as bit streams and m and k are natural numbers.

In step S310, the server 400 generates a k-bit binary vector s, which is a blinding vector. The blinding vector s is not known to the client 300. Each bit of the blinding vector s may be randomly selected between bit values 0 and 1.

In step S315, the server 400 generates a k-bit modified secret key y' based on the first secret key y and the blinding vector s by a predetermined first function.

In accordance with an embodiment of the present invention, for the input of the first secret key y, which is known to the client 300, and the blinding vector s, which is unknown to the client 300, the first function outputs the modified secret key y' by adding the first secret key y to the blinding vector s, as shown in Equation (5) above. That is, the first function is an addition function. The client 300 and the server 400 share the first function, i.e., the client 300 stores a first inverse function being the inverse function of the first function in a memory.

In step S330, the server 400 transmits a query message MSG(y') including the modified secret key y' to the client 300.

Upon receipt of the query message MSG(y'), the client 300 extracts the modified secret key y' from the query message MSG(y') in step S340.

In step S350, the client 300 calculates the blinding vector s using the modified secret key y' and the first secret key y by the first inverse function of the first function.

In accordance with an embodiment of the present invention, for the input of the first secret key y and the modified secret key y', the first inverse function outputs the blinding vector s by subtracting the first secret key y by the modified secret key y', as shown in Equation (7) above. That is, the first inverse function is a subtraction function.

The client 300 generates an m-bit binary vector v as an error vector in step S360. If v={$v_1, v_2, \ldots, v_m$}, the error vector v is a binary vector having a probability of η that $v_i$=1. The bits of the error vector v are determined according to the error generation parameter 11 being a probability satisfying that $0 < \eta < 1/2$. For the input of the error generation parameter η, a random function may output the binary vector v. The binary vector may be expressed as v(η).

In step S370, the client 300 generates an m-bit binary vector, i.e., a response vector z, based on a second secret key B, the blinding vector s, and the error vector v by a predetermined second function.

In accordance with an embodiment of the present invention, for the input of the second secret key B, the blinding vector s, and the error vector v, the second function outputs the response vector z by XOR-operating the inner product of the second secret key B and the blinding vector s with the error vector v, as shown in Equation (13).

$$z = ((B \cdot s) \oplus v) \quad (13)$$

In step S380, the client 300 generates a response message MSG(z) including the response vector z and transmits the response message MSG(z) to the server 400.

Upon receipt of the response message MSG(z), the server 400 extracts the response vector z from the response message MSG(z) in step S390.

The server 400 calculates the error vector v using the second secret key B, the blinding vector s, and the response vector z by a second inverse function, which is an inverse function of the second function, in step S400.

In accordance with an embodiment of the present invention, for the input of the second secret key B, the blinding vector s, and the error vector v, the second inverse function outputs the error vector v by XOR-operating the response vector z with the inner product of the second secret key B and the blinding vector s, as shown in Equation (14).

$$v=(z\oplus(B\cdot s)) \quad (14)$$

In step S410, the server 400 calculates a Hamming weight of the error vector v and compares the Hamming weight with a threshold mq (=m·q). If the Hamming weight is less than or equal to the threshold mq in step S410, the server 400 determines that the authentication of the client 300 is successful in step S420. If the Hamming weight exceeds the threshold mq in step S410, the server 400 determines that the authentication of the client 300 has failed in step S430.

In the above-described embodiments of the present invention, the server may be a reader and the client may be an RFID device.

While the terms a vector, a matrix, a key, etc., are used above to describe different embodiments of the present invention, they may be replaced with other values. Further, ordinal numbers such as first, second, third, etc., may be freely set.

As is apparent from the description above, a secret key is transmitted under cover by computing it with a blinding vector. That is, a value corresponding to a constant of the LPN problem is not exposed to an attacker.

In addition, authentication can be performed within the computational capacity of a resource-constrained device. Due to a small memory capacity requirement and a small transmission overhead, the above-described embodiments of present invention are applicable to a lightweight device. Because a server can authenticate a client securely against a man-in-the-middle type attack, known as the strongest attack, the above-described embodiments of the present invention can be safely applied to a resource-constrained device, such as a cheap RFID tag.

The above-described embodiments of the present invention can be implemented in hardware or a combination of hardware and software. The software can be recorded to a volatile or non-volatile storage device such as a Read Only Memory (ROM), irrespective of deletable or re-recordable, to a memory such as a Random Access Memory (RAM), a memory chip, a memory device, or an integrated circuit, or to a storage medium that is optically or magnetically recordable and readable by a machine (e.g., a computer), such as a Compact Disk (CD), a Digital Versatile Disk (DVD), a magnetic disk, or a magnetic tape. The storage device is an example of a machine-readable storage medium suitable for storing a program or programs including instructions to implement the above-described embodiments of the present invention. Accordingly, the present invention includes a program including a code for implementing the method as recited in the appended claims and a machine-readable storage medium that stores the program. The program may be transferred electronically through any medium such as a communication signal transmitted through a wired or wireless connection.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for authenticating a client by a server, the method comprising:
    transmitting, by the server, a query message including a first modified secret key to the client, wherein the first modified secret key is generated using a first secret key and a first blinding value;
    receiving, from the client, a response message including a response value, wherein the response value is generated using the first blinding value, a second secret key, and an error value;
    calculating the error value from the response value; and
    determining, based on the error value, whether authentication of the client is successful.

2. The method of claim 1, wherein the first and second secret keys are shared between the client and the server.

3. The method of claim 1, wherein determining whether the authentication of the client is successful comprises:
    comparing a number of 0s or 1s in the error value with a threshold; and
    determining, based on a comparison result, whether the authentication of the client is successful.

4. The method of claim 1, wherein determining whether the authentication of the client is successful comprises:
    comparing a Hamming weight of the error value with a threshold; and
    determining that the authentication of the client is successful, if the Hamming weight is less than or equal to the threshold.

5. The method of claim 1, further comprising receiving a blinding message from the client,
    wherein the blinding message is generated using a third secret key and a second blinding value, and
    wherein the response value is generated using the first and second blinding values, the second secret key, the error value, and a fourth secret key.

6. The method of claim 5, wherein the first to fourth secret keys are shared between the client and the server.

7. The method of claim 5, wherein the first and third secret keys, the first and second blinding values, and the error value are vectors, and
    wherein the second and fourth secret keys are matrices.

8. An authentication method by a client, the method comprising:
    transmitting, to a server, a blinding message including a first modified secret key, wherein the first modified secret key is generated using a first secret key and a first blinding value;
    receiving, from the server, a query message including a second modified secret key, wherein the second modified secret key is generated using a second secret key and a second blinding value; and
    transmitting, to the server, a response message for authenticating the client including a response value, wherein the response value is generated using the first and second blinding values, third and fourth secret keys, and an error value.

9. The method of claim 8, wherein the first to fourth secret keys are shared between the client and the server.

10. The method of claim 8, further comprising receiving, from the server, a message indicating whether authentication of the client is successful.

11. The method of claim 8, wherein the first and second secret keys, the first and second blinding values, and the error value are vectors, and wherein the third and fourth secret keys are matrices.

12. A server for authenticating a client, the server comprising:
    a communication module that transmits and receives messages to and from the client; and
    a controller that transmits via the communication module a query message including a first modified secret key to the client, wherein the first modified secret key is generated using a first secret key and a first blinding value, receives, via the communication module, a response message including a response value, wherein the response value is generated using the first blinding value, a second secret key, and an error value, calculates the error value from the response value, and determines, based on the error value, whether authentication of the client is successful.

13. The server of claim 12, wherein the controller determines whether the authentication of the client is successful by comparing a number of 0s or 1s in the error value with a threshold, and determines whether the authentication of the client is successful, based on a comparison result.

14. The server of claim 12, wherein the controller determines whether the authentication of the client is successful by comparing a Hamming weight of the error value with a threshold, and determines that the authentication of the client is successful, if the Hamming weight is less than or equal to the threshold.

15. The server of claim 12, wherein the controller receives a blinding message from the client via the communication module,
    wherein the blinding message is generated using a third secret key and a second blinding value, and
    wherein the response value is generated using the first and second blinding values, the second secret key, the error value, and a fourth secret key.

16. The server of claim 15, wherein the first to fourth secret keys are shared between the client and the server.

17. The server of claim 15, wherein the first and third secret keys, the first and second blinding values, and the error value are vectors, and
    wherein the second and fourth secret keys are matrices.

18. A client that performs an authentication procedure with a server, the client comprising:
    a communication module that transmits and receives messages to and from the server; and
    a controller that transmits, via the communication module, a blinding message including a first modified secret key to the server, wherein the first modified secret key is generated using a first secret key and a first blinding value, receives, via the communication module, a query message including a second modified secret key from the server, wherein the second modified secret key is generated using a second secret key and a second blinding value, and transmits, via the communication module, a response message for authenticating the client including a response value to the server, wherein the response value is generated using the first and second blinding values, third and fourth secret keys, and an error value.

19. The client of claim 18, wherein the controller receives, via the communication module, a message indicating whether authentication of the client is successful.

20. The client of claim 18, wherein the first and second secret keys, the first and second blinding values, and the error value are vectors, and
    wherein the third and fourth secret keys are matrices.

* * * * *